United States Patent

Wesener

[15] 3,636,883
[45] Jan. 25, 1972

[54] AUTOMATIC TRANSPORTATION SYSTEM WITH SELF-PROPELLED CARRIAGES

[72] Inventor: Erich Wesener, Munich-Laim, Germany
[73] Assignee: Buro Patent AG, Glarus, Switzerland
[22] Filed: Sept. 24, 1969
[21] Appl. No.: 860,699

Related U.S. Application Data

[63] Continuation-in-part of Ser. No. 626,197, Mar. 27, 1967, Pat. No. 3,502,038.

[30] Foreign Application Priority Data

Mar. 29, 1966 Switzerland ....................4480/66

[52] U.S. Cl................................................104/50, 246/85
[51] Int. Cl..........................................................B61l 11/08
[58] Field of Search ...................104/50, 129; 246/66, 85, 69, 246/125, 126, 254; 191/15

[56] References Cited

UNITED STATES PATENTS 704,948   7/1902   Spagnoletti............................246/85

*Primary Examiner*—Drayton E. Hoffman
*Assistant Examiner*—George H. Libman
*Attorney*—Karl F. Ross

[57] ABSTRACT

Carriages driven by individual DC motors travel over a track with a pair of continuous main bus bars for energizing the motor and with an auxiliary bus bar extending along certain track sections where switching operations are to be carried out, this auxiliary bus bar being energizable from the two main bus bars with a predetermined polarity upon the passage of a carriage over such a track section. The carriage is subdivided into a wheeled frame riding on the rails of the track and a swingable base carrying a traction wheel and contact brushes sliding along the bus bars, this base being spring loaded and weighted to maintain contact between the traction wheel and a cooperating track surface, as well as between the sliding brushes and the bus bars, even when the track is laid on a ceiling with the inverted carriages depending therefrom.

6 Claims, 5 Drawing Figures

Erich Wesener
INVENTOR

BY Karl F. Ross
Attorney

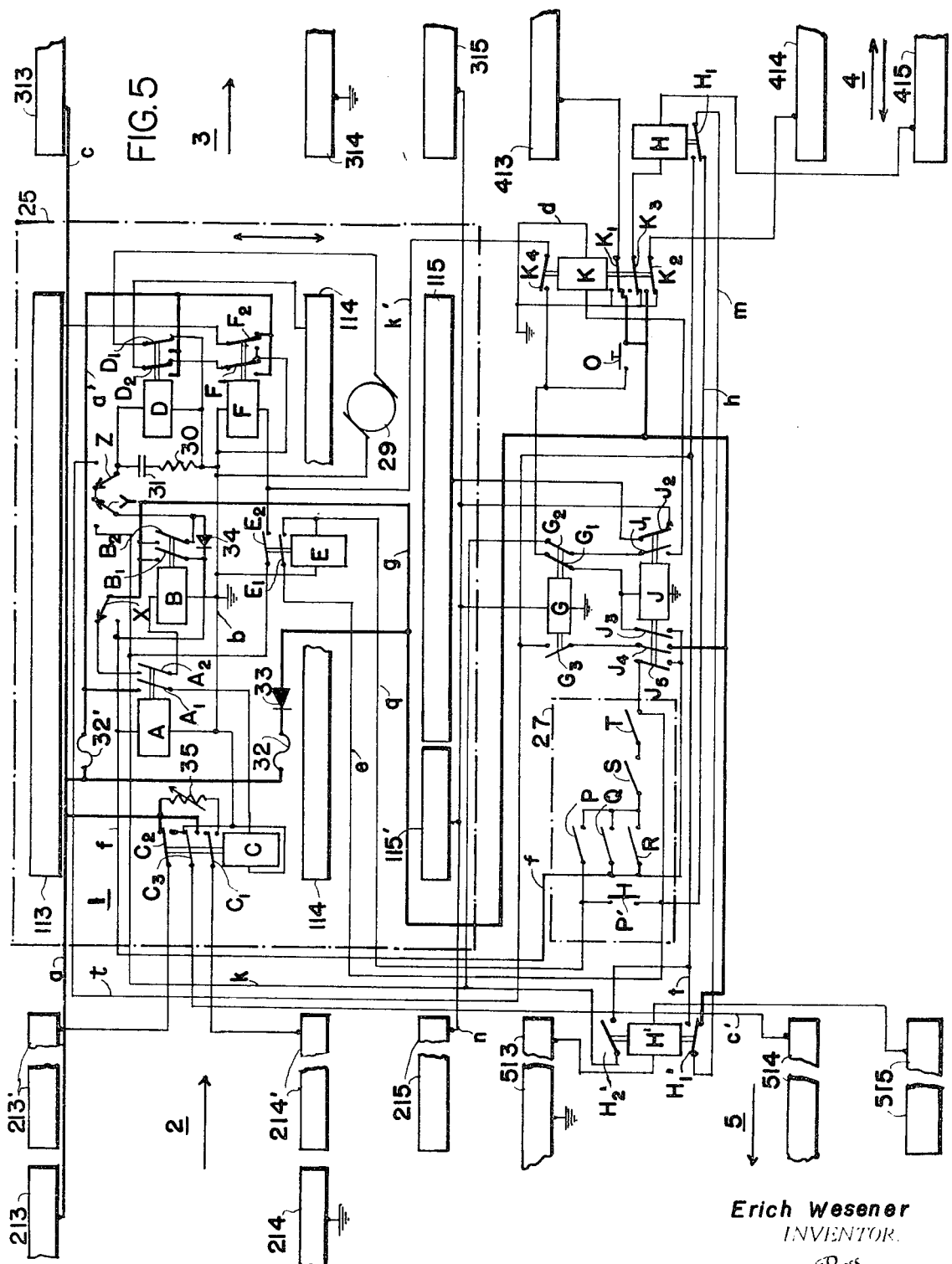

AUTOMATIC TRANSPORTATION SYSTEM WITH SELF-PROPELLED CARRIAGES

This application is a continuation-in-part of my application Ser. No. 626,197, filed Mar. 27, 1967, now U.S. Pat. No. 3,502,038.

My present invention relates to a transportation system, particularly for interoffice use, of the general type described in my prior U.S. Pat. No. 3,340,821.

In the system disclosed in my above-identified patent, carriages powered by individual DC motors are driven over tracks with horizontal and/or vertical sections, these track sections being formed by rails with flanged portions overhanging the supporting wheels of the carriage to prevent their detachment from the track except at some location where the overhanging flanges are cut away to permit manual insertion or removal of a carriage. The supporting wheels also serve to supply operating current to the motor aboard the carriage, with the rails acting as bus bars connected across a source of electric energy. Motion is imparted to the carriage alternately by a traction roller, frictionally engaging a preferably rough-surfaced ledge of the track bed, and by a cogwheel meshing with a stationary rack particularly along a nonhorizontal track section.

Each carriage is provided with destination-indicating code markings which are scanned by a reading device at a station or a track junction whereby a carriage may be shunted onto a siding or switched to a branch track at locations indicated by the selected code combination. Thus, as described in my copending application Ser. No. 626,197, referred to above, a transfer member such as a shuttle or slider carrying a mobile track section may be normally aligned with incoming and outgoing sections of a main track and, upon detection of a specific code combination by a reader mounted on that transfer member, may be moved into an off-normal position aligned with a secondary track section whereby a carriage present on the transfer member may be directed onto the latter track section, the transfer member thereupon returning to its normal position. Various controls are included in the system to prevent an untimely displacement of the shuttle while a carriage is approaching the junction, to arrest such an approaching carriage while the shuttle is off-normal, and to lock the shuttle-borne carriage in place during the transfer operation. These controls, according to the disclosure of my prior application, includes switch contacts disposed along the track for tripping by a passing carriage.

The use of such mechanical switches, however, involves the inconvenience that a number of switch contacts connected in parallel must be disposed along the track if the section served thereby exceeds the length of a carriage. Moreover, these switch contacts are necessarily exposed and therefore are subject to possible deformation, contamination and similar external influences impairing their effectiveness. An object of my present invention, therefore, is to provide an improved system of this character in which the need for such exposed switch contacts is eliminated.

Another object is to provide means for enabling the carriages to travel in any position (horizontal, upright, slanting, vertical or upside down) so that the track may be laid along floors, walls, ceilings and intermediate supports, with possible transfer points at any track section regardless of its orientation.

In accordance with an important feature of my present improvement, the necessary switching operations (other than those initiated by a reader responsive to the code markings on the carriage) are performed with the aid of an auxiliary bus bar (hereinafter referred to as "third rail") provided along certain track sections, this auxiliary bus bar being energizable from one of the main bus bars through circuits on a carriage passing thereover whereby a relay or equivalent switch means externally connected to that auxiliary bus bar can be operated to indicate the presence of a carriage on such track section. Since the length of the auxiliary bus bar can be extended indefinitely, no duplication of switches is needed even if a substantial portion of the track is to be thus surveyed.

In my above-identified prior patent I have shown that, with the use of channeled rails having overhanging flanges, the center of gravity of the carriage may be so disposed that the traction wheel (friction roller or sprocket) maintains its engagement with the coacting bed surface or rack even along vertical track sections. If, however, the angle included between the track and the vertical becomes negative, a point is reached where both the front and rear wheels of the carriage fall back against the overhanging rail flanges so that traction is lost. Also, under these circumstances, contact between the bus bars and the wheels would be at least momentarily broken so that continuity of the power supply becomes a problem.

Pursuant to another feature of my present invention, therefore, I divide the carriage into two relatively swingable portions, i.e., a load-carrying frame equipped with the supporting wheels and a motor-carrying base equipped with the traction wheel, this base being biased with reference to the frame to maintain the traction wheel in continuous contact with the cooperating track surface. Thus, traction is maintained regardless of the orientation of the track, i.e., with the supporting wheel riding on the rail bottom or bearing upon the overhanging flanges of an inverted track section.

In order to insure a continuous current supply, wiper brushes or equivalent contact means are provided on the swingable base of the carriage for uninterrupted engagement with the associated bus bars. Included among these contactors, in a preferred embodiment, is a separate brush positioned to engage the third rail and connected to the brushes for the main bus bars via rectifiers so poled that the polarity of its own potential does not change upon a reversal in the polarity in the DC voltage applied to the main bus bars; such reversal, as disclosed in my copending application Ser. No. 626,197, may be used to drive a carriage off the shuttle in a direction of arrival or to move a carriage from a siding or branch onto the shuttle in such opposite direction.

The invention will be described in greater detail hereinafter with reference to the accompanying drawing in which:

FIG. 5 is a circuit diagram of a movable track support disposed at a junction between a main line and two branch or auxiliary lines, generally similar to the junction shown in FIG. 4.

Figure 1:
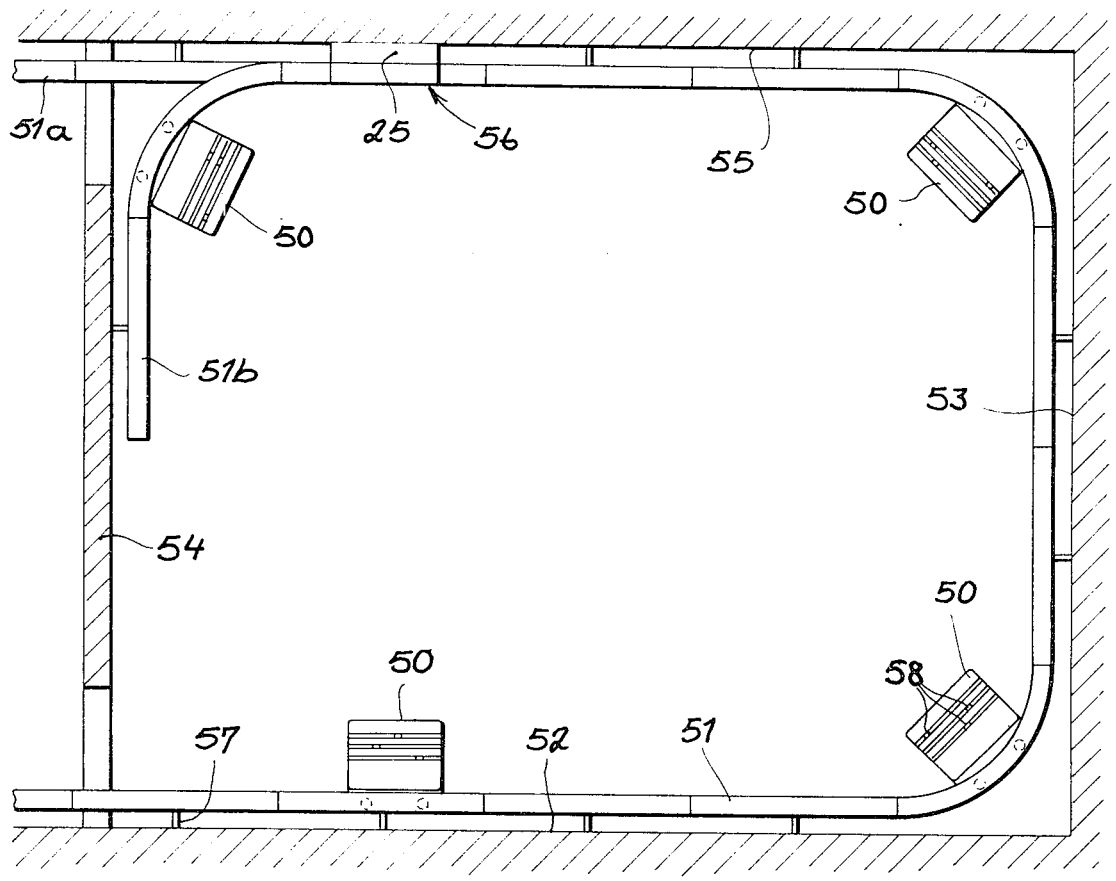
FIG. 1 is a diagrammatic overall view of a transportation system embodying my present invention, with a track having horizontal, vertical, inverted and inclined sections.

In FIG. 1 I have shown part of an interoffice transportation system wherein a plurality of self-propelled carriages 50 are movable along a track generally designated 51 within a building having a floor 52, sidewalls 53, 54 and a ceiling 55. The main line 51a of the track, after passing along floor 52, wall 53 and ceiling 55, may lead to a different room (or possibly to another building) whereas a branch 51b extends downwardly along wall 54 from a junction 56. The several track sections are supported on the floor, secured to the walls and suspended from the ceiling with the aid of stays 57.

The destination of the carriages 50 are indicated thereon by code markers 58, such as bar magnets, adapted to be placed in different relative positions as more fully described in my U.S. Pat. No. 3,340,821. At the corresponding junctions or terminal stations, readers sensitive to these magnets control solenoids or the like to perform the necessary switching operations. The body of each carriage is designed as a closable receptacle for the transportation of papers, bulk materials or other goods.

Figure 2:
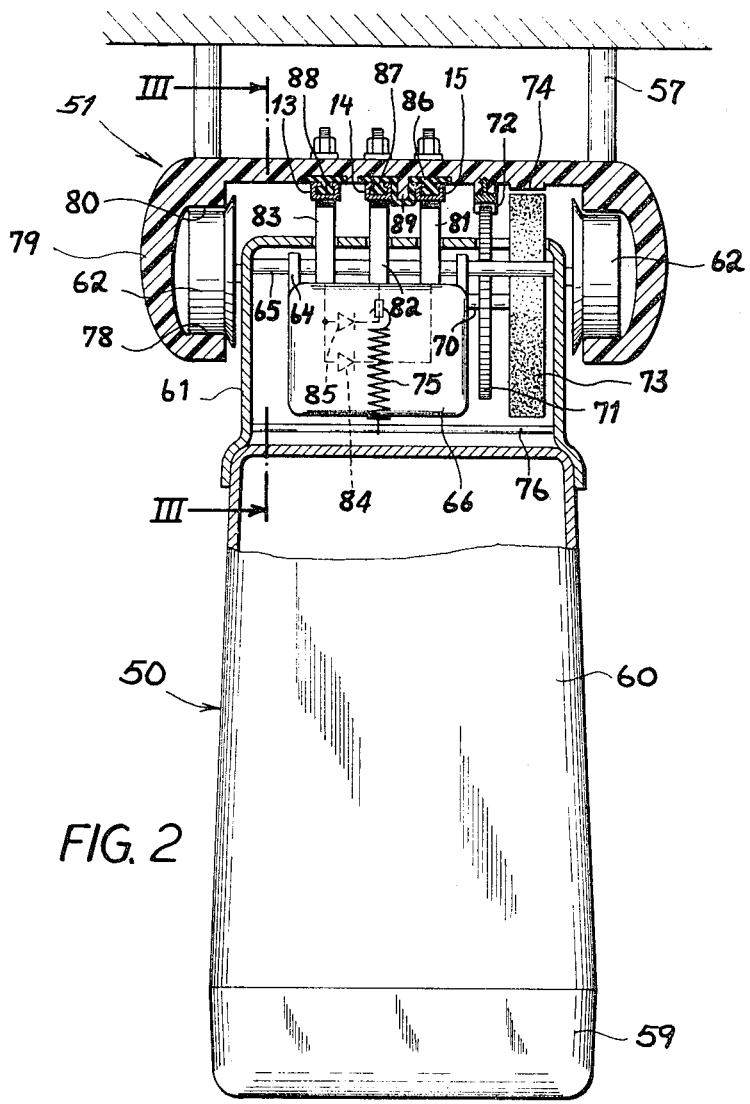
FIG. 2 is an elevational view (with parts broken away and somewhat diagrammatical) of a carriage positioned on an inverted section of the track shown in FIG. 1.
Figure 3:
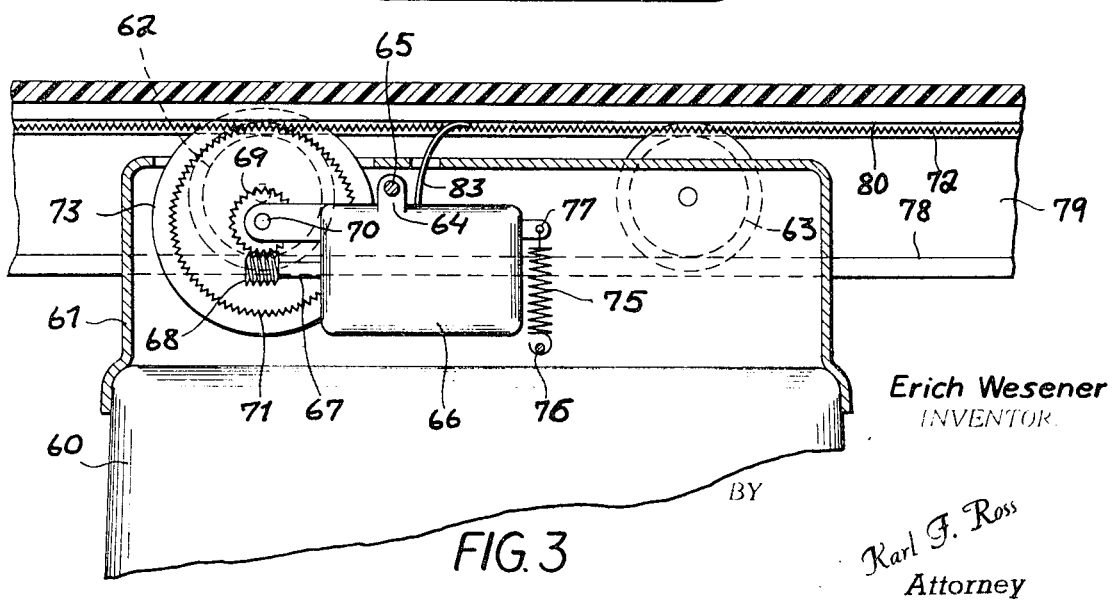
FIG. 3 is a fragmentary sectional view taken on the line III—III of FIG. 2.

Reference will now be made to FIGS. 2 and 3 for a more detailed description of the construction of any carriage 50. A lid 59 releasably covers the receptacle portion of the carriage which in turn is rigid with a frame 61 carrying front and rear pairs of supporting wheels 62, 63. Pivotally mounted within the frame, by means of lugs 64 engaging a horizontal rod 65, is a base 66 carrying a motor (not shown) whose shaft 67 terminates in a worm 68 meshing with a worm gear 69 on a transverse shaft 70. Keyed to the latter shaft are a toothed roller 71 designed as a cogwheel or sprocket, cooperating with a stationary rack 72 on track 51, and a friction roller 73 of larger diameter confronting a surface 74 of the rail bed. Rollers 71 and 73, together constituting the traction wheel of the carriage, are so dimensioned (as explained in my prior patent) that roller 73 is lifted off the surface 74 whenever cogwheel 71 steps onto a raised ledge carrying a section of rack 72. Along noninverted horizontal and slightly inclined track sections the toothed ledge forming the rack 72 will be omitted so that the vehicle 50 is propelled by the friction roller 73 riding on surface 74.

A biasing spring 75, anchored to frame 61 at a rod 76 and to base 66 at a lug 77, tends to swing that base about its fulcrum 65 to maintain the engagement between the traction wheel 71, 73 and the coacting rail surface 72 or 74 regardless of the orientation of the track. The frame 61, weighted down by the body 60 of the carriage, is suspended by its wheels 62, 63 from flange portions 78 of rails 79 overhanging these wheels, the latter riding on the bottom flanges 80 of these rails when the carriage is upright or moderately inclined. When the angle of inclination approaches 90°, the upper wheel pair swings over into contact with the outer flanges 78 while the lower wheel pair rests against the inner flanges 80; in the inverted position shown in FIGS. 2 and 3, both wheel pairs ride the flanges 78.

The sole of track 51 supports three bus bars, i.e., two main bus bars 13, 14 and an auxiliary bus bar or third rail 15. These bus bars are contacted by brushes 81, 82, 83 extending toward the track bottom from base 66, brush 83 being connected to brushes 81 and 82 via a pair of rectifiers 84, 85 so poled that the potential of brush 83 will be negative as long as either of bus bars 13 and 14 carries negative voltage. In the system more fully described hereinafter, the positive terminal of the associated direct-current source is assumed to be grounded. The bus bars are independently cushioned by supporting strips 86, 87, 88 of rubber or the like, strips 86 and 87 being integral with a divider 89 rising between the main bus bars to prevent any inadvertent short circuiting thereof.

Figure 4:
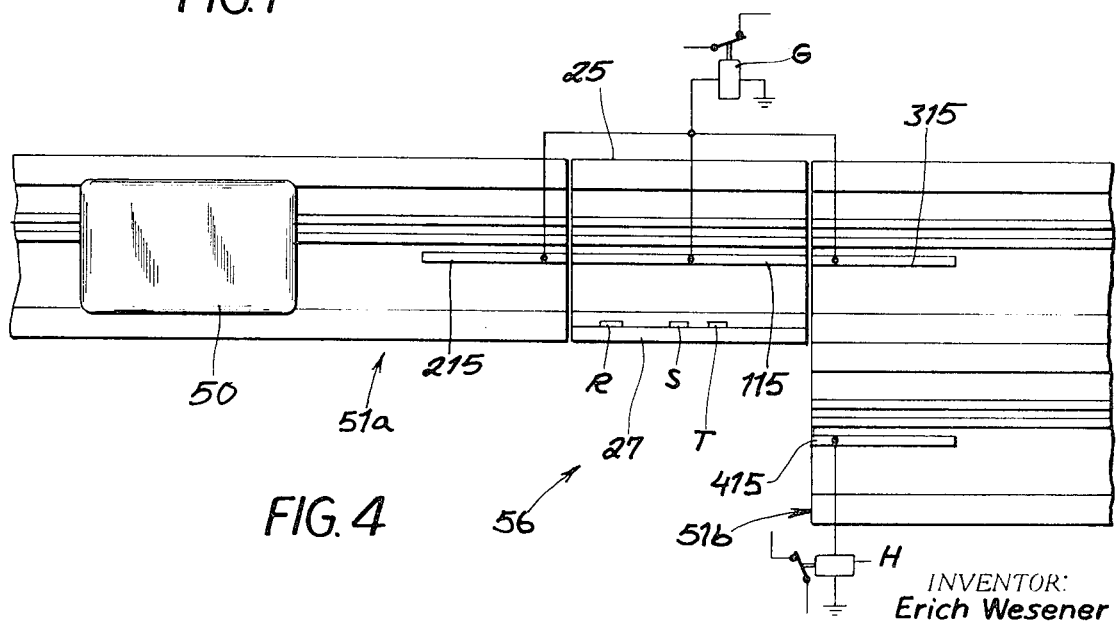
FIG. 4 illustrates a track section in the system of FIG. 1, including a junction between a main line and an auxiliary line.

In FIG. 4 I have illustrated a carriage 50 approaching, via the main track line 51a, the junction 56 of FIG. 1 from which the auxiliary line 51b branches off. This junction includes a shuttle 25 adapted to slide between its illustrated normal position in line with track section 51a and an off-normal position aligned with branch 51b. The third rail 15 of FIG. 2 extends only over a part of the track in the vicinity of junction 56 and is seen to include three sections 115 (on shuttle 25), 215 (on the incoming side of main line 51a) and 315 (on the outgoing side of the main line); a similar rail section 415 forms part of the branch 51b and lines up with rail section 115 when the shuttle 25 is in its off-normal position. The displacement of the shuttle is controlled by a reader in the form of a panel 27 rising from one of the shuttle rails, this panel carrying a set of magnetic test switches R, S, T responding to the proximity of correspondingly positioned magnets 58 (FIG. 1) on a passing carriage 50 as more fully described hereinafter.

The transportation system here shown in designed not only to transfer a carriage from the main line 51a to the branch line 51b but also, if desired, to return a carriage from the branch 51b to the main line 51a for further travel in the direction indicated by the arrow in FIG. 4. To this end it is necessary to provide means (described in detail below) for recalling the shuttle 25 to its off-normal position when a carriage to be so returned is waiting on track section 51b. Such recall, however, must not take place while another carriage is approaching the junction 56, has entered the transfer switch 25 or is in the process of leaving same, hence a relay G is connected between ground and the three third-rail sections 115, 215, 315 to prevent the displacement of the shuttle when any of these rail sections carries negative potential in the presence of a carriage 50 thereon. In an analogous manner, a relay H is connected between third-rail section 415 and ground to prevent a transfer of a carriage from line 51a to line 51b as long as the latter line is occupied by another vehicle in the vicinity of junction 56.

In FIG. 5 I have shown a junction which differs from the junction 56 of FIG. 4 only in that the shuttle 25 is designed as a double switch whose mobile track section 1 is alternately alignable with fixed track sections 2, 3 of a main line and with fixed track sections 4, 5 of a pair of branch lines. The arrangement is generally similar to that shown in FIG. 3 of my copending application Ser. No. 626,197, and like reference characters have been used to designate corresponding elements.

At the incoming track section 2, the current rails or bus bars 213 and 214 are interrupted so that there exist separate bus bar sections 213' and 214'. Bus bar sections 213' and 214' may have a length ranging from one to several carriage lengths, depending upon the volume of traffic passing over the illustrated junction.

Bus bar 213 is permanently connected to the negative terminal of the associated DC source, its potential being also applied to bus bar 313 via a conductor $c$ branching off a lead $a$. The positive terminal (ground) of the source is permanently connected to bus bar section 214, 314 and 513 as well as to a lead $b$. A relay A with two armatures $A_1$, $A_2$ is connected between ground lead $b$ and a conductor $f$ which lies in series with the three sensing switches R, S and T of reader 27 and, upon simultaneous closure of all of these switches, is extended to a conductor $h$ terminating at a back contact of an armature $H_1$ of the aforementioned relay H. This armature, in turn, is connected via a conductor $m$ to an armature $H_1'$ of a similar relay H' associated with track section 5; the back contact of the latter armature is tied to a lead $g$ which is permanently connected to negative potential on lead $a$ through a fuse 32 and a diode 33 in series therewith. A conductor $t$ interconnects the front contacts of the armatures $H_1$ and $H_1'$, terminating at a normally disconnected bank contact of a switch Z which is reversed whenever the shuttle 25 arrives in its alternate position aligned with track sections 4 and 5. A similar switch Y, normally in series with switch Z, reverses concurrently with the latter and is connected via a diode 34 to a conductor $f$. A relay D lies between ground lead $b$ and switch Z, being shunted by a time-constant network in the form of a resistor 30 and a capacitor 31. A normally open-circuited bank contact of switch Y is connected via a lead $k$ to another armature $H_2'$ of relay H' having a front contact tied to lead $t$.

Switches Y and Z maintain their reversed position until the shuttle 25 starts for home; a similar switch X, connected to negative lead $g$, is thrown as soon as the shuttle 25 moves off normal and is not restored until the home position is again reached.

Switches X, Y and Z, responsive to the shuttle position, are advantageously of the magnetic type similar to the sensing switches R, S, T and may be actuated by a permanent magnet on a turntable or driving disk with a shuttle-engaging crank pin which performs a full revolution during a reciprocation of shuttle 25. Reference is made to my above-identified patent and application for details of a crank drive serving to reciprocate the shuttle with the aid of an eccentric roller or the like received in a slot of the shuttle.

A bank contact normally engaged by switch X is connected to a front contact of relay armature $A_2$ which leads to the winding of another relay B and thence to ground. Relay B has two armatures $B_1$ and $B_2$ whose front contacts are connected to lead $g$, armature $B_1$ being directly tied to lead $f$ whereas armature $B_2$ is connected to the junction of diode 34 and switch Y. The front contact of armature $A_1$ is connected to an extension $a'$ of negative lead $a$ containing a fuse 32', another relay C being inserted between ground at $b$ and armature $A_1$.

Relay C normally connects, via armatures $C_1$, $C_2$ and associated back contacts, ground from lead $b$ and negative potential from lead $a$ to bus bar sections 214' and 213', respectively; this corresponds to the permanent mode of energization of bus bars 213, 214 as well as 313, 314, establishing a sense of travel from left to right in FIG. 5 as indicated by the arrows. Upon energization of relay C, armature $C_2$ grounds the bus bar section 213' whereas armature $C_1$ connects bus bar section 214' to negative battery on lead $a$ via a resistor 35 whereby a reduced inverted voltage is applied to the motor of a carriage approaching the transfer switch 1 on track section 2. Resistor 35 is adjustable so that, for a given track orientation, the reverse current is insufficient to drive the carriage in the opposite direction, this current being of course larger on descending track sections so as to balance the force of gravity to arrest the carriage. In any event, however, third rail 215 is energized to operate the lockout relay G, already referred to in the description of FIG. 4, whenever a carriage stands on track 2 so close to the junction that its brushes 81, 82 (FIG. 2) contact the bus bars 213' and 214'. A third armature $C_3$ or relay C, connected via a conductor $c'$ to bus bar 514, normally grounds that bus bar but connects it to negative voltage on lead $a$ whenever the relay is operated.

The winding of a relay E is connected between ground lead $b$ and a lead $q$ which (with relays H and H' unoperated) is connectable to negative lead $g$ via conductors $h$, $m$ in series with sensing switches S, T and a further switch P on panel 27 whose closure by a passing fourth code magnet indicates that the carriage so marked is to be switched onto track 5 rather than track 4. A manual switch P' on the panel can be closed to bypass the switches P, R, S with establishment of a permanent connection between conductors $a$ and $g$ whereby all oncoming carriages are automatically transferred to track 5 regardless of their code setting. Another switch Q of reader 27 can be manually closed to short circuit the sensing switch P whereby the reader will respond to all code combinations causing simultaneous closure of at least the sensing switches S and T.

Relay E has a holding armature $E_1$, with a front contact connected via a lead $e$ to conductor $h$, and a working armature $E_2$ with a front contact tied to lead $k$ in the energizing circuit of a relay F. The latter relay has two armatures $F_1$, $F_2$ which, in its unoperated state, connect ground lead $b$ and negative lead $a'$ to bus bars 114 and 113, respectively, thereby conditioning the mobile track section 1 for through traffic of carriages arriving over track section 2. Armature $F_1$ lies in series with a back contact and armature $D_2$ of a normally unoperated relay D whose other armature $D_1$ normally brakes the rotor of a unidirectionally operating motor 29, driving the shuttle-reciprocating crank, by grounding both terminals of its armature winding. Energization of relay D causes armature $D_2$ to apply negative potential to bus bar 114 so as to immobilize a carriage standing on shuttle 25 if, with relay F released, the same potential is also present on bus bar 113. With relay D released, operation of relay F reverses the normal potentials of bus bars 113 and 114.

A pushbutton-type manual switch O at track section 4 allows the energization of a recall relay J in a circuit extending from negative lead $g$ via an armature $G_1$ and back contact of lockout relay G through the winding of relay J to ground. A circuit extends via conductor $k$, a back contact and armature $G_2$ of relay G, and an armature $J_1$ and front contact of relay J through the winding of a polarity-reversing relay K to ground whereby this relay operates, upon reversal of switch Y in the alternate position of shuttle 25, if relay J is energized and relay G is released. Relay K has two armatures $K_1$, $K_2$ for switching negative potential from bus bar 413 to bus bar 414 and ground from bus bar 414 to bus bar 413 when that relay is energized whereby a carriage standing on track section 4 is driven from right to left, i.e., onto the waiting shuttle 25. A third armature $K_3$ of relay K interrupts, in its energized state, the operating circuit or relay H extending from third rail 415 to a grounded conductor $d$. A fourth armature $K_4$ of relay K has a front contact connected to a lead $k'$ forming an alternate energizing circuit for relay F in parallel with relay J by way of armature $G_1$ of the unoperated relay G.

The mobile third rail 115 is separated by a small gap from an extension 115' thereof confronting the corresponding rail 215 or 515 of an adjoining fixed track section. Extension 115' is permanently connected in parallel with rails 215 and 315, via a conductor $n$ forming part of the operating circuit of relay G; bus bar 115 is connected to conductor $n$ through an armature $J_2$ and back contact of relay J so that negative potential on this bus bar will not operate the relay G if recall relay J has been activated. The separation of bus bar sections 115' and 115 is designed to define a terminal position for a carriage rolling onto track 1 from track 4 as more fully described hereinbelow; relay J, locking over an armature $J_3$ and front contact to conductor $f$ which receives negative voltage in the off-normal position of switch X, has a further front contact and armature $J_4$ connected in series with a front contact and armature $G_3$ of relay G between conductors $g$ and $t$ to actuate the driving relay D when both relays G, J are operated. A further front contact and armature $J_5$ of relay J serve to short circuit the sensing switches R, S, T in the operated condition of recall relay J.

Let us consider, first, the case of a carriage arriving at the junction of FIG. 5 over track 2 with code markings corresponding to the setting of sensor 27. If no carriage stands on either of tracks 4, 5 in the vicinity of the junction, bus bars 514 and 515 are deenergized and relays H, H' are released. Negative potential from lead $g$ is then extended to conductor $e$ whereby conductor $f$ is energized as soon as panel switches R (or Q), S, T are simultaneously closed. Start relay A now operates and, via its armatures, $A_1$ and $A_2$, actuates the relays C and B inasmuch as switch X is normal in the home position of shuttle 25. Relay B holds the relay A via its own armature $B_1$ while relay D, responding to the energization of conductor $f$ with a slight delay due to its capacitive shunt circuit 30, 31, immobilizes the carriage and starts the drive motor 29. As the shuttle 25 moves toward its alternate position, switch X reverses and releases the relay B but maintains relays A and C operated independently of sensor 27 and relay armatures $H_1$, $H_1'$ by directly interconnecting the leads $f$ and $g$. Relay C, by reversing the potentials of bus bars 213' and 214', insures the stopping of any oncoming further carriage on the portion of track 2 served by these bus bars; the simultaneous application of negative voltage to bus bar 514 prepares the track 5 for the onward travel of a carriage discharged toward the left (upon closure of switch P or P') from mobile track 1. Any other vehicle standing next to the junction on track 5 is driven off at this time; the presence of such a vehicle (and/or that of a further carriage on track 4 in the vicinity of the junction) inhibits the operation of drive relay D through the operation of relay H' (and/or H) until the track is cleared.

When the shuttle 25 arrives in its alternate position, reversal of switches Y and Z transfers the operating circuit of relay D from lead $f$ to lead $t$. The temporary release of relay D reapplies a voltage difference to bus bars 113 and 114 so as to move the carriage off the shuttle; with switch P or P' closed, relay E operates in the reversed position of switch Y to bring on the relay F with consequent reverse energization of bus bars 113 and 114 to drive the carriage onto track 5 in lieu of track 4.

If the carriage is transferred to track 4, its wipers 81, 83 (FIG. 2) contact the bus bars 413, 415 which are thus bridged by the internal circuit of the carriage including the rectifier 84. Negative voltage on bus bar 413 is thereby transmitted to bus bar 415 and energizes the relay H to reverse its armature $H_1$ so that lead $t$ is connected to potential on lead $g$ and relay D operates to restart the motor 29. If, instead, the carriage is discharged onto track 5, bus bars 514, 515 are bridged (by way of rectifier 85) to bring on the relay H' whose armature $H_2'$ thereupon interconnects leads $k$ and $t$ with a like result. As soon as the shuttle 25 heads for home, position switches Y, Z return to normal and the drive of the shuttle is maintained independent of external circuitry until position switch X reverses to restore the normal state of deenergization of motor 29 and all relays.

Let us now assume that the operator desires to return a carriage from the siding or branch 4 to the main line for continuing travel via track 3. Depression of pushbutton O actuates the relay J if relay G is released at this time, i.e., if no carriage is present on shuttle track 1 or in its vicinity on fixed track 2 or 3. (Since the immobilization of a carriage on the shuttle upon the operation of relay D involves the application of negative potential—rather than ground—to both main bus bars 113 and 114 of the shuttle, auxiliary bus bar 115 and/or its extension 115' are always energized during a transfer operation; the gap between these rails is so narrow as to be bridgeable by the coacting brush 83.) Lamps or other indicators not shown, may be provided to indicate the operated or unoperated state of relay G and/or relay J. If the latter relay responds, its armature $J_2$ opens the operating circuit of relay G via bus bar 115 so that this relay will not be actuated during entry of a carriage from the right onto the displaced shuttle 25. With tracks 4 and 5 clear, armature $J_5$ extends the potential of lead $g$ via leads $m$ and $h$ to conductor $f$ to bring on relays A, B, C, D as heretofore described whereby the shuttle 25 leaves its home position and moves into alignment with track 4. Reversal of switch Y then energizes the conductor $k$, via the off-normal switch X, so that relay K is operated by way of armatures $G_2$ and $J_1$; this operation may also be indicated to the user by a lamp or the like. Relay J, via its armature $J_3$, locks to potential on lead $f$ (independently of pushbutton O) which is energized as soon as switch X reverses upon incipient movement of shuttle 25.

The system is now ready to receive a carriage for transfer from track 4 via the recalled shuttle to track 3. Such a carriage may be placed manually on the track 4 (e.g., at a point where the rail flanges 78, FIG. 2, are cut away) or may be moved up from a normally deenergized extension of track 4 through operation of a switch applying the proper potential difference to its bus bars. Since relay K has reversed the normal polarity of bus bars 413 and 414, the vehicle continues to the left and moves onto the track 1 of the shuttle. Owing to the energization of lead $k$ by way of armature $K_4$, relay F is operated at this point so that the polarity of the voltage on track 1 allows the carriage to move further onto the shuttle. As soon as the carriage brush 83 (FIG. 2) reaches the bus bar extension 115', relay G responds and at its armature $G_1$ removes voltage from lead $k'$ so that relay F falls back and, briefly, restores the normal polarity of the shuttle bus bars. Before, however, the carriage on the shuttle 25 can move significantly in the opposite direction, the closure of the operating circuit of relay D by way of armatures $G_3$ and $J_4$ applies negative voltage to bus bar 114 so as to immobilize the carriage as the shuttle starts on its way home. In attracting its armature $G_2$, relay G releases the relay K; the holding circuit of relay J is broken upon the reversal of switch X whereupon the shuttle discharges the retransferred carriage to track 3 and the system returns to normal.

Since the track 5 is deenergized except during the operation of shuttle 25, carriages transferred to that track will move only intermittently so that the same can serve for the storage of vehicles to be kept out of circulation. Whenever such a laid-up carriage reaches a certain point remote from the junction of FIG. 5, it may trip a relay (similar to relay H') to perform a function analogous to that of pushbutton O, i.e., to initiate the recall of another shuttle serving to return it to the line 2–3 or to another throughgoing track.

Naturally, the electromagnetic relays shown in the drawing may be replaced by equivalent electronic circuitry.

Although the rack 72 has been shown next to bus bar 13 in FIGS. 2 and 3, it could also be placed on the other side of the track (with corresponding relocation of the sprocket wheel 31) and has been so illustrated in FIG. 4. In fact, the rack could be omitted on all horizontal track sections including the overhead section shown in FIGS. 2 and 3, its presence being essential only for vertical and steeply inclined track sections to facilitate the ascent and to slow the descent of the vehicles.

I claim:

1. In a transportation system having a track with rail means, at least one carriage including drive means for propelling same along said track, and conductor means along said track for energizing said drive means, the improvement wherein said conductor means includes a pair of continuous main bus bars connected across a source of driving current and an auxiliary bus bar normally disconnected from said source, said auxiliary bus bar extending only over a limited track section provided with switch means for signaling the passage of said carriage over said track section, said carriage being provided with primary contact means engaging said main bus bars and with secondary contact means engageable with said auxiliary bus bar, said carriage further including circuit means interconnecting said primary and secondary contact means to energize said auxiliary bus bar in a bridging position of said carriage, said switch means being connected to said auxiliary bus bar for energization thereby, said drive means comprising a reversible direct-current motor and said source being of reversible polarity, said circuit means including a pair of rectifiers connected between said contact means and said drive means and so poled as to energize said auxiliary bus bar with a predetermined polarity regardless of the relative polarity of said main bus bars.

2. A track with rail means, at least one carriage including drive means for propelling same along said track, and conductor means along said track for energizing said drive means, the improvement wherein said conductor means includes a pair of continuous main bus bars connected across a source of driving current and an auxiliary bus bar normally disconnected from said source, said auxiliary bus bar extending only over a limited track section provided with switch means for signaling the passage of said carriage over said track section, said carriage being provided with primary contact means engaging said main bus bars and with secondary contact means engageable with said auxiliary bus bar, said carriage further including circuit means interconnecting said primary and secondary contact means to energize said auxiliary bus bar in a bridging position of said carriage, said switch means being connected to said auxiliary bus bar for energization thereby, said drive means comprising a reversible direct-current motor and said source being of reversible polarity, said circuit means including a pair of rectifiers for energizing said auxiliary bus bar with a predetermined polarity regardless of the relative polarity of said main bus bars, said switch means comprising a relay connected in circuit between said source and said main bus bars for modifying the energization of said main bus bars and energizable to arrest said carriage on said track section.

3. In a transportation system having a track with rail means, at least one carriage including drive means for propelling same along said track, and conductor means along said track for energizing said drive means, the improvement wherein said conductor means includes a pair of continuous main bus bars connected across a source of driving current and an auxiliary bus bar normally disconnected from said source, said auxiliary bus bar extending only over a limited track section provided with switch means for signaling the passage of said carriage over said track section, said carriage being provided with primary contact means engaging said main us bars and with secondary contact means engageable with said auxiliary bus bar, said carriage further including circuit means interconnecting said primary and secondary contact means to energize said auxiliary bus bar in a bridging position of said carriage, said switch means being connected to said auxiliary bus bar for energization thereby, said drive means comprising a reversible direct-current motor and said source being of reversible polarity, said circuit means including a pair of rectifiers for energizing said auxiliary bus bar with a predetermined polarity regardless of the relative polarity of said main bus bars, said track including a mobile shuttle forming part of said limited track section, a main line with a gap normally occupied by said shuttle, and a branch line with a terminal section adjacent said gap for alignment with said shuttle in a displaced position thereof, the system further comprising recall means operable to displace said shuttle into an off-normal position aligned with said terminal section for receiving a carriage therefrom, and blocking means controlled by said switch means for disabling said recall means in the presence of another carriage on said limited track section.

4. A transportation system having at least one direct-current-driven carriage, a track with rail means for guiding said carriage and including a pair of continuous main rails connected to a source of reversible-polarity electric current for operating said carriage and an interrupted third rail extending over a limited section of said track, and switch means for signaling the passage of said carriage over said track section, said carriage being provided with circuit means interconnecting said continuous rail and said third rail for maintaining the electrical polarity of the latter constant independently of the reversal of said source.

5. The system defined in claim 4 wherein said circuit means includes a pair of parallel rectifiers, each of said rectifiers being provided with brushes connecting same to the respective rails.

6. The system defined in claim 5 wherein said carriage comprises a frame, supporting wheels on said frame engaging said track, a face pivotally mounted on said frame, a traction wheel on said face bearing upon a cooperating surface of said track, a direct-current motor connected to said traction wheel for driving same, biasing means for urging said traction wheel into contact with said surface while maintaining said support wheels in engagement with said track to enable said carriage to move along said track in outright, inclined, vertical and inverted positions, said system further comprising a siding at a location along said track, said track having a movable portion shiftable into alignment with said siding, said movable portion shiftable into alignment with said siding, said movable portion and said siding having alignable third-rail sections.

* * * * *